(12) United States Patent
Albert et al.

(10) Patent No.: US 6,976,517 B2
(45) Date of Patent: Dec. 20, 2005

(54) CYCLE RIM AND TUBELESS MOUNTED ASSEMBLY FOR A CYCLE

(75) Inventors: Loïc Albert, Clermont-Ferrand (FR); Bernard Moreau, Clermont-Ferrand (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 10/757,580

(22) Filed: Jan. 15, 2004

(65) Prior Publication Data
US 2004/0155519 A1 Aug. 12, 2004

Related U.S. Application Data

(63) Continuation of application No. PCT/EP02/07620, filed on Jul. 9, 2002.

(30) Foreign Application Priority Data
Jul. 17, 2001 (FR) ................................. 01 09581

(51) Int. Cl.⁷ ........................................ B60C 15/024
(52) U.S. Cl. .............................. 152/381.4; 152/379.3
(58) Field of Search ................ 351/95.101; 152/379.3, 152/379.4, 379.5, 381.3, 381.4, 382, 383

(56) References Cited

U.S. PATENT DOCUMENTS 2,198,978 A * 4/1940 Sauer ...................... 152/381.4
3,405,755 A * 10/1968 Verdier .................... 152/381.3
4,878,527 A * 11/1989 Noma ...................... 152/379.3
5,634,993 A   6/1997 Drieux et al.
5,787,950 A * 8/1998 Muhlhoff et al. ........ 152/379.5
6,257,676 B1  7/2001 Lacombe et al.
6,415,839 B1 * 7/2002 Pompier et al. ......... 152/381.4

FOREIGN PATENT DOCUMENTS

| DE | 886 697 | 7/1953 |
|----|---------|--------|
| EP | 0 334 955 | 10/1989 |
| EP | 1 002 669 | 5/2000 |
| GB | 2 061 199 | 5/1981 |
| JP | 61-16102 | * 1/1986 |
| JP | 63-28701 | * 2/1988 |

* cited by examiner

Primary Examiner—Russell D. Stormer
(74) Attorney, Agent, or Firm—Buchanan Ingersoll PC

(57) ABSTRACT

The invention relates to a rim for cycles, more particular for bicycles. The invention is also aimed at a tubeless mounted assembly consisting of the said rim and of a tire having in particular two flexible bead wires. According to the invention, the rim consists of two flanges, attached to two seats, intended to receive the beads of a tire, separated from each other by a mounting groove, and, according to the profile of the rim in a radial plane, the bead seats have a generatrix, the axially outer end of which is on a circle of smaller diameter than the diameter of the circle on which the axially inner end is situated, the said generatrix forming an angle with the axis of rotation of the tire of between 15 and 45 degrees.

18 Claims, 4 Drawing Sheets

CYCLE RIM AND TUBELESS MOUNTED ASSEMBLY FOR A CYCLE

This application is a continuation of International PCT/EP02/07620 filed on Jul. 9, 2002, and which claims priority from patent application Ser. No. 01/09581 filed in France on Jul. 17, 2001.

BACKGROUND OF THE INVENTION

The invention relates to a rim for a cycle wheel. The invention is also aimed at a mounted assembly for cycles, more particularly for bicycles, consisting of a rim and of a tire. The invention is aimed more particularly at cycles intended to be associated with tires which are to operate without an inner tube, of the tubeless type.

An ordinary rim, made of a single part, of the tubeless type, in particular intended for motor vehicles, consists of different regions; first of all, starting from an outer edge of the rim, there is a rim flange, or flange, the main role of which is to retain the bead of the tire in the inflated state; next, the bead seat, on which the bead of the tire rests and which ensures the gripping thereof, as well as the airtightness; and finally, a groove intended to permit the mounting of the tire owing to the fact that its diameter is less than that of the flange. In the case of a rim having humps, the latter are present between the bead seat and the groove which allows the mounting. The humps are bosses, the function of which is to prevent or at the very least delay the occurrence of an unseating of the tire particularly in the event of a low pressure.

The usual procedure for mounting a tubeless tire on such a rim consists of various steps, as follows; firstly, a part of the first bead is passed over the rim flange and this part is placed in the groove. Then, the rest of the bead can be passed over the rim thanks to a slight ovalisation of the corresponding bead wire of the tire. The procedure is the same for passing the second bead over the rim flange. The mounting is then completed with a final step of inflation to a pressure which ensures that the beads are put in place on the seats, bearing on the rim flanges. During this last step, the beads pass over the humps which form an obstacle to the passage of the said beads as far as their respective seat.

Bicycle tires have some distinctive features; the bead wires are very flexible and the deformation of the lower region can thus be very substantial. This is not without its disadvantages in the case of a tubeless tire, since there must be complete tightness between the rim and the tire and more precisely between the rim and the beads of the tire.

Although not limited to such applications, the invention will be more particularly described with reference to mounted assemblies intended to equip bicycles for road use. A distinctive feature of these mounted assemblies is that the operating pressure is of the order of 8 bars; the latter possibly also attaining values of the order of 11 bars when the tires are subjected to extreme conditions, in particular in competition, during which the temperature of the air inside the tire may increase very substantially, and bring about an increase in the pressure. This is the case, for example, when braking heavily on mountain descents where the friction of the brake block on the rim leads to such a temperature increase.

It is known at present to produce mounted assemblies of the tubeless type for bicycles of the MTB (mountain bike) type; the operating pressure of such tires is of the order of 2 bars. There has already been described, in the patent application EP 0 893 280, an improved rim which facilitates the inflation conditions of such a tubeless tire and which improves the stability of the tire in the inflated state in the event of a violent lateral impact. Such a rim is characterized by the presence, on the one hand, of a narrow groove which promotes the inflation phase while ensuring the tightness between the beads and the rim; and, on the other hand, this rim is characterized by the presence at the groove edge of humps which allow the beads of the tire to be maintained on the seats provided for this purpose in the event of a violent lateral impact, in particular, for example, in the event of impact with stones.

Tests have been carried out with this type of rim for the production of a mounted assembly intended for road use and thus brought to pressures of the order of 8 bars. It turns out that, although in fact the use of a rim such as that described by the patent application EP 0 893 280 makes it possible to start the inflation of the tire with certainty, whatever the characteristics of the tires tested, above a certain pressure unseating of at least one bead occurs and consequently the tire comes off the rim. In addition, the pressures attained upon the unseating of the beads of the tire are generally less than 8 bars and thus less than the operating pressure commonly required and markedly less than the pressures which may be attained in extreme situations such as that set out above.

The inventors have thus set themselves the task of producing a rim, and a mounted assembly consisting of the said rim and of a tire, for use on bicycles for road use, the said mounted assembly being of the tubeless type and not presenting any risks to the user, in particular of coming off the rim, at the pressures normally required for this type of use.

SUMMARY OF THE INVENTION

This object has been achieved according to the invention by a rim for a cycle wheel, designed to receive a tire having in particular two flexible bead wires, so as to form a mounted assembly, the said rim consisting of two flanges, attached to two seats intended to receive the beads of the tire, separated from each other by a mounting groove, the bead seats having, according to the profile of the rim in a radial plane, a generatrix, the outer end of which is on a circle of smaller diameter than the diameter of the circle on which the axially inner end is situated, and the said generatrix forming an angle with the axis of rotation of the tire of between 15 and 45 degrees.

According to a preferred embodiment of the invention, the generatrix forms an angle with the axis of rotation of the tire of between 16 and 26 degrees. Preferably again, the angle of the generatrix is greater than 18°. Preferably again, the angle is less than 22°, in particular to simplify the industrial production of the rim.

According to the invention, "axial" is understood to mean a direction parallel to the axis of rotation of the rim and "radial" is understood to mean a direction intersecting the axis of rotation of the rim and perpendicular to this axis. The axis of rotation of the rim is the axis about which the rim rotates in normal use. The circumferential mid-plane is a plane perpendicular to the axis of rotation of the rim and dividing the rim into two halves. A radial plane and a plane which contains the axis of rotation of the rim.

The essential feature of the rim according to the invention is that, according to a profile of the rim in a radial plane, the bead seats have a generatrix of constant slope and of which the angle with respect to the axial direction is between 15 and 45°. According to a preferred embodiment of the invention, the axially inner end of the generatrix is adjacent to the mounting groove.

Advantageously again, the rim according to the invention is symmetrical with respect to a circumferential mid-plane.

The tests carried out with the rims according to the invention show that it is possible to attain the service pressure for road use without observing unseating of the beads. In addition, it has turned out that it is also possible to attain pressures of the order of 11 bars, that is to say pressures which correspond to the most extreme conditions to which the mounted assemblies may be subjected, without risk to the user and in particular without risk of unseating.

The improvements brought by the invention to the profile of the rim thus allow the production of a mounted assembly of the tubeless type for road use with the guarantee of satisfactory inflation and which present no risk to the user.

In their procedures, the inventors were able to demonstrate that the ordinary rims for cycles, as well as those previously developed for tubeless applications, exhibited weaknesses in the seating of the beads in the case of the use of a road tire of the tubeless type. Their studies demonstrated that during inflation and as the pressure increases, the flexibility of the bead wires causes the air to pass under the bead leading to a rapid and large increase in the tension borne by the bead wire, corresponding to a separation of the bead from the corresponding seat of the rim.

The inventors were then able to demonstrate that the increase in the surface of the bead in contact with the air, owing to its separation from the seat of the rim, leads to an unseating of the bead at pressures less than those which have to be attained for the same result when the contact between bead and rim still exists. It thus follows that, as soon as the pressure corresponding to the separation of the bead is attained, the risks of the beads being unseated and coming off the rim become very great.

The rim profile defined according to the invention makes it possible to maintain a rim/bead contact at higher pressure than those measured upon the unseating of the bead on a known rim.

In addition, the rim according to the invention allows the tire to be "clipped on" and has a function of resistance to unseating under an operating pressure less than the minimum recommended pressure.

According to a preferred embodiment of the invention, the difference in diameter between the ends of the generatrices of the bead seats is between 0.5 and 3 mm and this difference is preferably greater than 1 mm and preferably again strictly greater than 2 mm. Such differences in diameters between the ends of the generatrix of the bead seats promote the maintenance of a contact between the bead and the rim seat when the pressure increases.

Advantageously, the invention provides for the rim, the groove of which consists of a groove bottom and two side walls, to be such that at least the upper parts of the side walls make an angle of at least 35° and are centered on the circumferential mid-plane. Such an angle will in particular promote the mounting of the tire on the rim; in fact, the arrangement of the bead seats may make it difficult to mount the tire owing in particular to the fact that this arrangement involves a greater obstacle to clear, in particular in terms of the necessary deformation of the beads during mounting, than is imposed by an ordinary rim. The variant embodiment of the invention proposes a groove wall, at the very least in its upper part, that is to say in the region immediately before the clearing of the obstacle which leads to the bead seat, the slope of which is less steep than that proposed by the ordinary rims; such a wall slope will make possible a smoother clearing of the obstacle by allowing the bead to slide on this upper part of the wall.

This variant embodiment will, on the one hand, make it possible to ensure that the beads are better put in place on their seat and in particular ensure a better symmetry of the positioning of the said beads. On the other hand, the less abrupt deformation of the bead wires of the beads makes it possible to limit the risks of incipient damage to the said bead wires.

Advantageously again, the invention provides for the bottom parts of the walls of the groove to make an angle of at most 35° and to be centered on the circumferential mid-plane. Such a construction ensures in particular a sufficient width of the groove bottom which makes it possible to receive the two beads of the tire before the inflation phase of the mounting of the said tire on the rim commences.

According to an advantageous embodiment of the invention, the flanges of the rim have hooks which form an overhang towards the inside of the rim at the vertex of each of the flanges.

Preferably again, the hooks form an overhang towards the inside of the rim of at least 0.5 mm with respect to the surface of the flange at the hooking point of the said hook.

The presence of such hooks makes it possible to increase the effectiveness of holding the tire without observing unseating of the beads.

An advantageous variant of the invention provides for the presence of humps, arranged between the groove and the bead seats, and more precisely between the end of the upper part of a wall of the groove and the axially inner end of a bead seat. Such a construction may also help to promote a delay of the separation of the beads from the surface of the rim when the pressure increases within the tire. The function of these humps is more specifically to maintain the beads on their seats in particular in the event of deflation of the tire or a puncture.

According to a first embodiment of the invention, the profile of the rim according to the invention is directly produced using the customary techniques known to a person skilled in the art, such as the techniques of bending, rolling and welding, used in particular for the production of aluminium rims.

According to another embodiment of the invention, the rim is obtained by associating a rim blank and at least one added element which forms the bead seats defined according to the invention. If humps are present, the invention can also provide, according to this variant, for the said humps to form part of the added elements.

Variants of the invention according to this last embodiment can further provide for the added elements to be made of a material different from that of the rim blank.

The invention further provides for the added elements to be capable of being fixed to the rim blank by any means known to a person skilled in the art, such as, for example, by screwing, clipping, crimping, bonding, etc.

In an advantageous variant of the invention, particularly in the case of the production of a tire of the tubeless type, the region of the rim receiving the tire forms an upper bridge without orifices except for the orifice for the inflation valve.

The said inflation orifice is, moreover, preferably provided in the mounting groove and preferably again in the bottom or lower region of the said groove. Such a design promotes the inflation of a tire of the tubeless type, the air being able to be introduced directly between the beads of the tire, which are previously inserted into the mounting groove.

According to a preferred variant of the invention, the rim is connected to a central hub of the wheel by a plurality of spokes fixed to a lower bridge of the rim.

The invention further proposes a mounted assembly for cycles consisting essentially of a wheel and a tire of the tubeless type, the said tire having in particular two flexible bead wires, and the wheel comprising a rim such as that described above.

The tire according to the invention, fitted to such a mounted assembly, of the tubeless type, having in particular two flexible bead wires, possesses beads having at least one lip and the said lips bearing on at least one part of the side walls of the mounting groove, in the running condition, that is to say after mounting of the tire on the rim.

According to a first embodiment of the invention, the lips are excrescences from the beads obtained during the production of the said beads.

According to another embodiment of the invention, the lips are obtained by the association of at least one element added onto the bead, the said element being able to be of a material different from that of which the beads are composed.

The inventors were able to demonstrate that the lips of the tire according to the invention make it possible to help to avoid a separation of the tire during inflation, in particular for road use, in combination with rims according to the invention.

According to a preferred embodiment of the invention, the bead wires of the tire have a modulus of elasticity less than 8000 daN/mm$^2$. Above such a value, the tire would be less susceptible to unseating owing to the lower flexibility of its bead wires. Likewise preferably, the modulus of elasticity is greater than 3000 daN/mm$^2$. It turns out that below this value the inventors were able to demonstrate that the realization of the invention via the profile of the rim, optionally combined with the presence of lips on the tire, is difficult to achieve in the case of a mounted assembly for a bicycle for road use.

The tire is chosen with a development adapted to the rim, according to customary practices.

DESCRIPTION OF THE DRAWINGS

Other details and advantageous features of the invention will emerge below from the description of an exemplary embodiment of the invention with reference to FIGS. 1 to 6 which show.

The figures are not shown to scale to simplify the understanding thereof.

DESCRIPTION OF PREFERRED EMBODIMENTS

Figure 1:
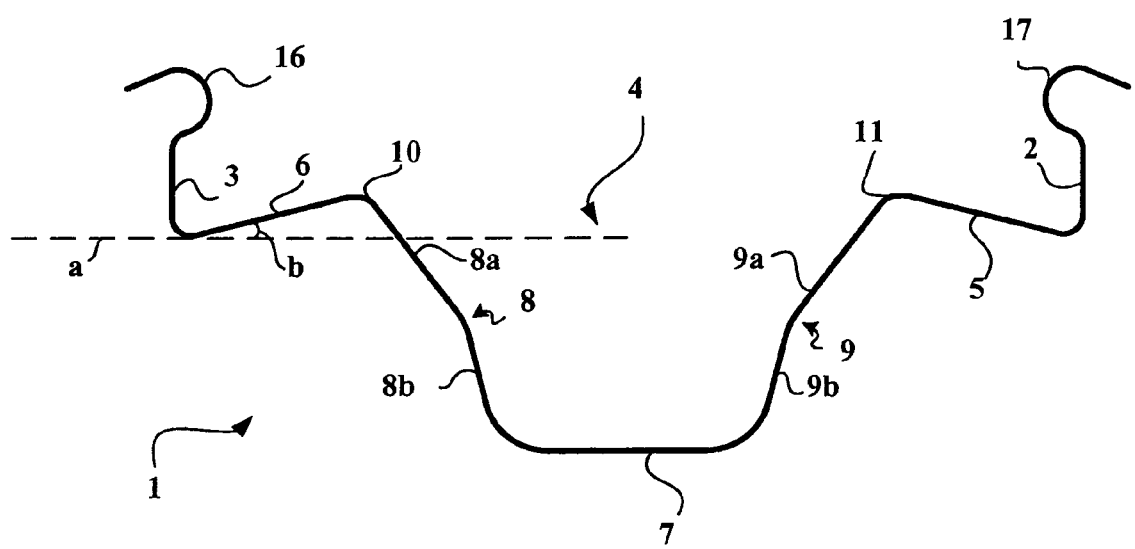
FIG. 1, a diagram of a radial sectional view of a rim according to the invention, FIG. 2, a diagram of a radial sectional view of a second embodiment of a rim according to the invention, FIG. 3, a diagram of a radial sectional view of a third embodiment of a rim according to the invention, FIG. 4, a diagram of a partial radial sectional view of a tire according to the invention, FIG. 5, a diagram of a partial radial sectional view of another tire according to the invention, FIG. 6, a diagram of a partial radial sectional view of a mounted assembly according to the invention.

FIG. 1 shows diagrammatically a radial sectional profile of a rim 1 according to the invention. The rim consists of two flanges 2, 3 at the outer ends, connected to the groove 4 by bead seats 5, 6. The orientation of the flanges 2 and 3 is substantially parallel to the circumferential mid-plane. The bead seats 5 and 6 form an angle b of about 20° with a line a that is parallel to the axis of rotation. The groove 4 consists, on the one hand, of a groove bottom 7 and two side walls 8, 9, unusually inclined by comparison with ordinary rims for bicycles. These walls 8 and 9 according to the invention are constructed in two parts in the representation of FIG. 1; first, lower parts 8b, 9b which form an angle of about 30° and are centered on the circumferential mid-plane and second parts or upper parts 8a, 9a which form an angle of about 65° and are centered on the circumferential mid-plane. The flanges further possess, in the upper part, hooks which form an overhang towards the inside of the rim of 0.5 mm with respect to the plane of the flanges at the hooking point of the said hooks.

When mounting a tire of the tubeless type, of traditional form, on such a rim according to the invention, the first step is to bring the two tire beads into the groove 4 of the rim.

This first step is simple to perform since the bead wires of the tires for bicycles are ordinarily made of a flexible material such as, for example, an aromatic polyamide or glass fibers. The use of flexible bead wires for bicycle tires is particularly linked to the need to simplify the mounting of the said tire which is generally performed by the user, possibly with simple tools which are compact so as to be capable of being carried. In addition, the flexibility of these bead wires also makes it possible for the user to carry an unmounted tire, the space taken up by the latter being limited by the fact that it is possible to fold it.

In a second step, the tire is inflated; for this, the rim 1 is fitted with a valve, not shown in the figures, advantageously placed in the groove bottom 7 so as to make it possible to inject the air directly between the two beads of the tire. The groove bottom 7 is provided with a width such that it can receive the two beads, the latter bearing against the walls 8 and 9 to ensure the tightness of the system. This result is particularly obtained by the presence of the inclined walls 8b and 9b particularly at the lower part of the groove 4 which make it possible to reduce the width of the groove bottom 7 for a given width of rim 1.

The upper part of the walls 8a and 9a of the groove 4 is advantageously provided with an inclination greater than the lower part of the said walls 8b and 9b to make it possible for the beads to rise as far as the vertices 10 and 11 of these walls which, compared with ordinary rims, necessitate a greater deformation of the beads owing to their height. The large inclination of the upper part of the walls 8a and 9a actually makes it possible for the beads to reach these vertices 10 and 11 in a smooth manner without jerks, thereby making it possible to maintain a tight contact between the beads and the walls and furthermore to obtain a good positioning of the beads on the seats 5 and 6 of the rim 1, the said positioning being obtained symmetrically between the two beads.

The beads of the tire are thus put in place on the seats 5 and 6, provided for this purpose, in contact with the flanges 2 and 3 which retain the said beads. The slope of the said seats which according to the invention is inclined axially towards the outside of the rim will make it possible to retain the said beads and to prevent any risk of them coming off the rim, particularly in the case of a mounted assembly intended to equip bicycles for road use.

The flanges 2 and 3 further include hooks 16 and 17 which also help to maintain the contact between the beads of the tire and the seats 5 and 6 when the pressure increases within the tire.

Tests have been carried out with this type of mounted assembly of size 23-622 on a 622 rim using tubeless technology. By way of comparison, the same tests are carried out on rims such as those mentioned above intended to equip MTBs with a tubeless mounted assembly. The tires used are tires of the tubeless type which have a modulus of elasticity of 4000 daN/mm². For road use, the operating pressure is generally 8 bars. As it is known, as stated above, that in extreme conditions the pressure attained may be greater, the tests are carried out until unseating is observed.

The following results are obtained; in the case of the rim already known, it turns out that it is impossible to mount a tubeless tire. In fact, it is found that the tire comes off the rim at a lower pressure than that which it is necessary to attain for the application under consideration.

In the case of the rim according to the invention, the tests have shown that the mounting of a tubeless tire on this rim can be performed without mishap at the operating pressure of 8 bars and that it is possible to attain pressures of the order of 11 bars without the risk of the tire coming off the rim. In fact, the unseating of the tire was observed at a pressure of 14.5 bars, a pressure which will not reasonably be attained for this type of tire.

Figure 2:
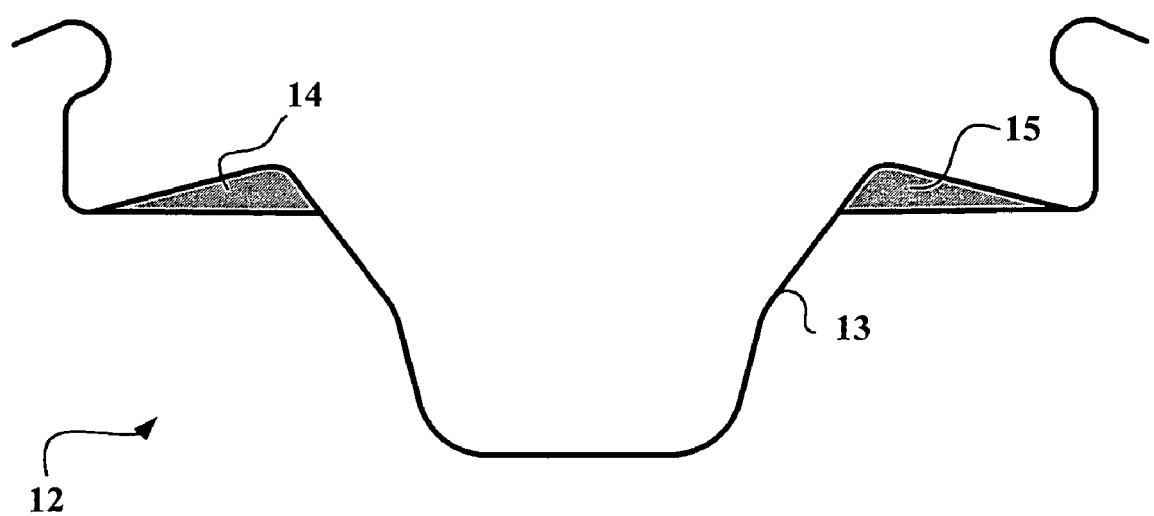

FIG. 2 shows diagrammatically a second embodiment of a rim 12 according to the invention. The profile in a radial plane of this rim 12 is identical to that of the rim 1 shown in FIG. 1. By contrast, as mentioned above, the rim 12 is produced by combining a rim blank 13 and two added elements 14, 15 which constitute in particular the bead seats according to the profile provided by the invention.

Production of a rim according to the invention from a plurality of elements may possibly enable simplification of the industrial production of such a rim which has a complex profile. Such a production may, moreover, allow modification of existing rims by adding the said additional elements 14 and 15. In fact, in this case the added elements are defined to complement the profile of an existing rim in order to obtain the profile defined by the invention.

The added elements thus essentially constitute the bead seats but also the upper part of the walls of the groove and particularly the part which may have, according to the invention, a greatly inclined part to facilitate the putting in place of the beads when mounting the tire.

Figure 3:
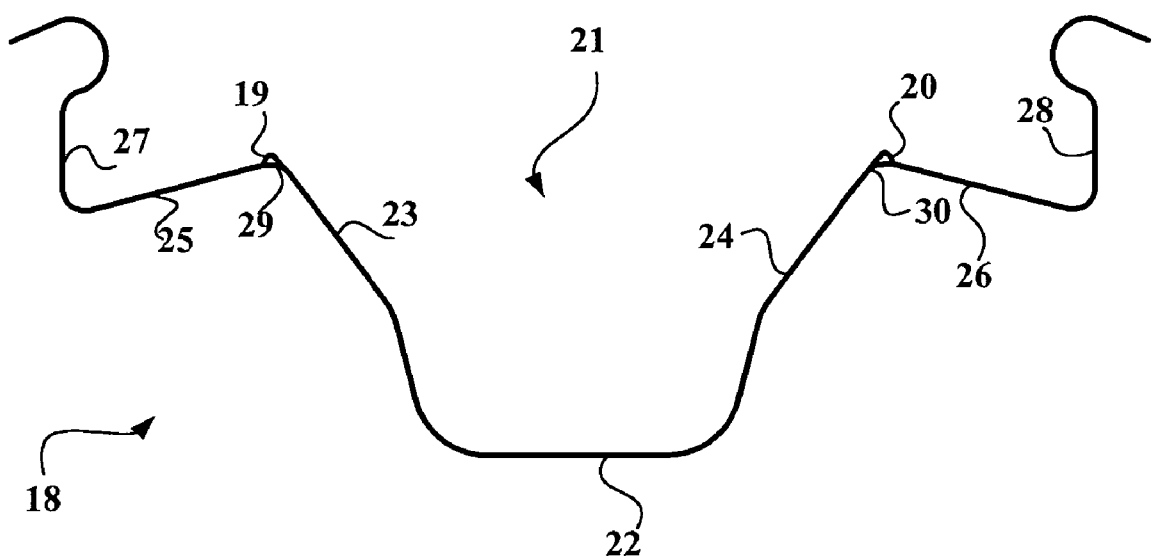

FIG. 3 illustrates another type of embodiment of a rim 18 according to the invention, the said rim having humps 19 and 20. In the case of this FIG. 3, the rim 18 has in particular a groove 21 consisting of a groove bottom 22 and side walls 23 and 24 bordered respectively by the bead seats 25, 26, themselves attached to the flanges 27, 28. According to this variant embodiment of the invention, situated at the vertices 29 and 30 of the groove, that is to say at the points of intersection of the walls 23, 24 of the groove and the bead seats 25, 26, are humps 19, 20. When mounting a tire on the rim 18, the beads are brought over these humps to come into position on the seats 25, 26. Their function is essentially to prevent any risk of unseating in the event of a loss of pressure. However, it turn out that these humps can also help to keep the beads in place during inflation and to avoid separation of the said beads.

In the case of a rim of the type of that in FIG. 2 which consists of added elements which constitute in particular the bead seats, the said humps will advantageously be formed on the added elements.

The rims defined by the invention thus make it possible to produce tubeless mounted assemblies, intended for bicycles for road use, which do not present any risk of unseating and coming off the rim owing to the operating pressure, or pressures which may be attained in extreme situations.

The rim according to the invention further has the advantage of being able to receive a traditional tire, that is to say a tire which is to be associated with an inner tube. Such a construction is advantageous in that it may help the user out if he does not have a tubeless tire available, for example to carry out a repair.

Figure 4:
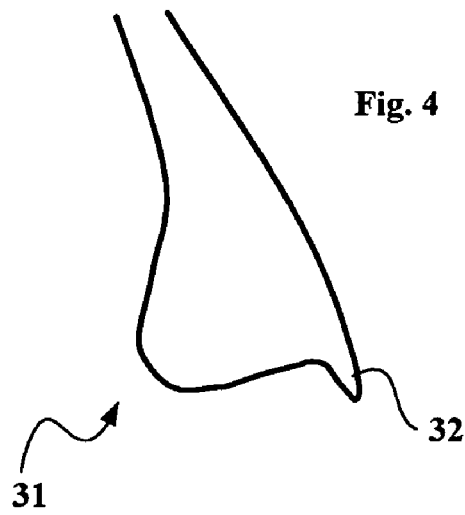

FIG. 4 illustrates in a highly simplified manner a lower part of a tire for producing a mounted assembly according to the invention. This FIG. 4 shows a bead 31 which has, according to the invention, a lip 32 which constitutes a downward excrescence from the bead. The lower part 32 of the bead 31 which is to come to bear on the seat of a rim is extended by this appendix or lip 32 which, after mounting, will bear on the wall of the mounting groove of the said rim, as will be seen later.

Figure 5:
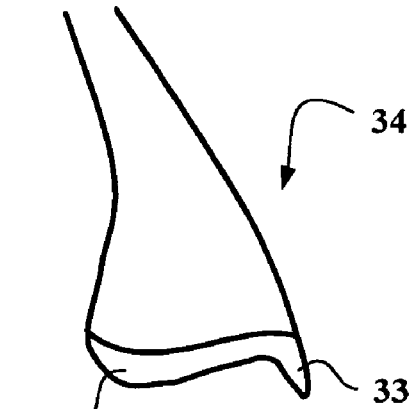

FIG. 5 illustrates the case of a lip 33 made of a material different from that of which the bead 34 is composed. This variant embodiment may make it possible to obtain different properties of the bead in a localized manner, for example as regards its rigidity or else its capacity to create a resistance to friction relative to the material of which the rim is composed. In the case of FIG. 5, the added part goes beyond the lip 33 itself and constitutes the entire lower region 35 of the bead 34; this may in particular make it possible to guarantee the solid attachment of this part 35 to the rest of the bead 34. The part thus added to the bead 34 and having in particular the lip may be of any other form and constitute any other region of the bead including the lip 33.

The material of which the lip 33 and the part 35 are composed may be a rubber material or a plastic material. This part 35 may be solidly attached to the bead 34 by any means known to a person skilled in the art and in particular by bonding, vulcanization, mechanical assembly, etc.

Figure 6:
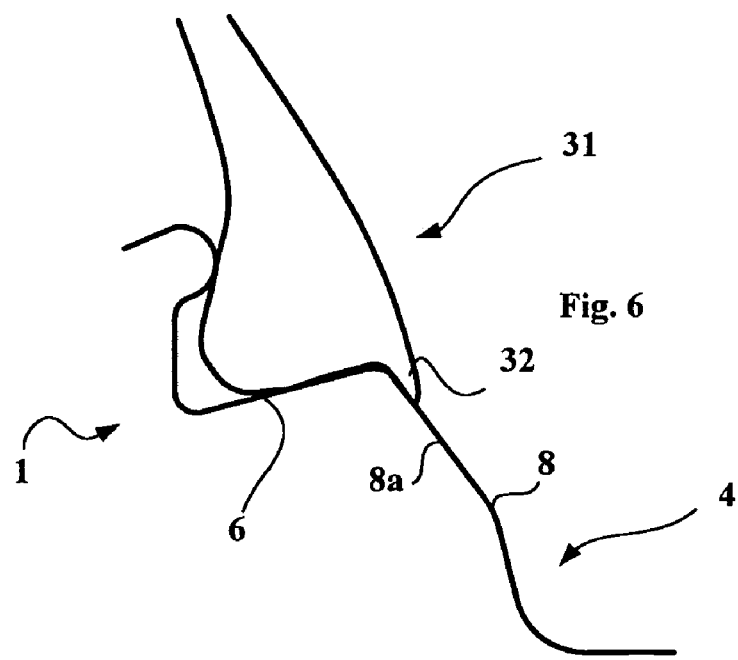

FIG. 6 shows diagrammatically a part of a mounted assembly according to the invention having a tire such as that in FIG. 4 and a rim 1 such as that in FIG. 1. The tire thus put in place has a bead 31, the lower part of which comes to bear on the seat 6. The lower part is extended by the lip 32 which rests on the upper part of the region 8a of the wall 8 of the mounting groove 4. The positioning of the lip 32 on the region 8a affords additional protection from separation of the bead 31 by opposing the passage of the air. It should be noted that this combination according to the invention of a tire having a lip 32 and of a rim according to the invention, which allows the bead to be "clipped on", produces results which are particularly advantageous for road use.

In general, the invention is to be understood as applying to any type of wheel which is to be associated with tires which have flexible bead wires and the operating pressures of which are relatively high and in particular greater than 5 bars, for example wheels for wheelchairs for handicapped people or else vehicle wheels used on low-consumption vehicles such as those of the "Challenge Shell".

What is claimed is:

1. Rim for a cycle wheel, designed to receive a tire having two flexible bead wires, so as to form a mounted assembly, the rim defining an axis of rotation and comprising two flanges, attached to two seats, intended to receive the beads of a tire, separated from each other by a mounting groove, wherein, according to the profile of the rim in a radial plane, the bead seats have a generatrix, the axially outer end of which is on a circle of smaller diameter than the diameter of the circle on which the axially inner end is situated and in that the generatrix forms an angle with the axis of rotation of between 15 and 45 degrees.

2. Rim according to claim 1, wherein the angle formed by the generatrix of the bead seats and the axis of rotation is between 16 and 26 degrees.

3. Rim according to claim 1, wherein the difference in diameter between the ends of the generatrices of the bead seats is between 0.5 and 3 mm.

4. Rim according to claim 3 wherein the difference in diameter is greater than 2 mm.

5. Rim according to claim 1, the mounting groove comprising a groove bottom and two side walls, wherein at least the upper parts of the walls make an angle of at least 35° and are centered on the circumferential mid-plane.

6. Rim according to claim 1, the mounting groove comprising a groove bottom and two side walls, wherein the bottom parts of the walls of the groove make an angle of at most 35° and are centered on the circumferential mid-plane.

7. Rim according to claim 1, wherein the flanges have hooks.

8. Rim according to claim 7, wherein the hooks form an overhang towards the inside of the rim of at least 0.5 mm with respect to the plane of the flange at the hooking point of the hook.

9. Rim according to claim 1, wherein humps are arranged between the groove and the bead seats.

10. Rim according to claim 1, wherein each of the bead seats is formed by at least one element attached to a rim blank.

11. Rim according to claim 1, wherein the region receiving the tire forms an upper bridge without orifices except for an orifice for an inflation valve.

12. Rim according to claim 11, wherein the orifice for the inflation valve is provided in the groove.

13. Mounted assembly for cycles comprising a wheel and a tire of the tubeless type, the tire defining an axis of rotation and having two flexible bead wires in its beads, and the wheel comprising a rim, the rim comprising two flanges attached to two seats, intended to receive the beads of a tire, separated from each other by a mounting groove, wherein, according to the profile of the rim in a radial plane, the bead seats have a generatrix, the axially outer end of which is on a circle of smaller diameter than the diameter of the circle on which the axially inner end is situated and in that the generatrix forms an angle with the axis of rotation of the tire of between 15 and 45 degrees.

14. Mounted assembly according to claim 13, wherein at least one bead of the tire has a lip bearing on a side wall of the mounting groove.

15. Mounted assembly according to claim 14, wherein the lips are excrescences from the beads and wherein the lips are formed during the production of the beads.

16. Mounted assembly according to claim 14, wherein each of the lips is formed by at least one element attached to the bead.

17. Mounted assembly according to claim 16, wherein the lip is made of a material different from that of which the beads are composed.

18. Mounted assembly according to claim 13, wherein the bead wires of the tires have a modulus of elasticity less than 8000 daN/mm$^2$ and/or greater than 3000 daN/mm$^2$.

* * * * *